United States Patent [19]

Powers

[11] Patent Number: 5,394,899
[45] Date of Patent: Mar. 7, 1995

[54] PET WATERING BOWL

[76] Inventor: Ernest G. Powers, P.O. Box 192, Clermont, Ga. 30527

[21] Appl. No.: 166,295

[22] Filed: Dec. 13, 1993

[51] Int. Cl.⁶ ............... F16K 31/22; F16K 31/24; F16K 31/14
[52] U.S. Cl. ..................... 137/430; 119/80; 137/390; 137/433
[58] Field of Search ............ 119/78, 80; 137/430, 137/, 433, 390, 443, 444; 251/14, 324

[56] References Cited

U.S. PATENT DOCUMENTS

| | | | |
|---|---|---|---|
| 425,619 | 4/1890 | Murphy | 137/444 |
| 558,643 | 4/1896 | Fennessy | 137/430 |
| 855,764 | 6/1907 | Gaylor | 137/430 |
| 1,149,494 | 8/1915 | Briggs | 137/390 |
| 1,161,745 | 11/1915 | Springman | 137/433 |
| 1,357,986 | 11/1920 | Jerdone, Jr. | 137/390 |
| 1,391,956 | 9/1921 | Holland | 137/390 |
| 1,432,103 | 10/1922 | Feller | 137/390 |
| 2,087,913 | 7/1937 | Kenney et al. | 137/430 |
| 2,211,296 | 8/1940 | Shaft | 137/390 |
| 2,628,631 | 2/1953 | Boyd | 137/430 |
| 2,716,422 | 8/1955 | Whitlock, Jr. | 137/433 |
| 2,726,675 | 12/1955 | Bohler | 137/430 |
| 2,995,144 | 8/1961 | Manning et al. | 137/422 |
| 3,016,044 | 1/1962 | Sollars | 137/433 |
| 3,522,013 | 7/1970 | Borgeson | 137/430 |
| 4,276,902 | 7/1981 | Roth | 137/505.18 |
| 4,301,827 | 11/1981 | Murthy et al. | 137/430 |
| 5,275,194 | 1/1994 | Gray, Jr. | 137/75 |

Primary Examiner—George L. Walton
Attorney, Agent, or Firm—Bernstein & Associates

[57] ABSTRACT

Apparatus for controlling the level of a fluid in a reservoir. A reservoir has a trough within which is a valve means comprising a hollow cylindrical body having inlet and outlet apertures in fluid communication with a fluid source. A valve shuttle assembly slidingly connected to the valve comprises an "O" ring seal which defines a sealing region. The sealing region can occlude the fluid inlet aperture or permit fluid to pass to the outlet aperture. The valve shuttle is interconnected to a float which rises and lowers depending on the fluid level in the reservoir.

16 Claims, 7 Drawing Sheets

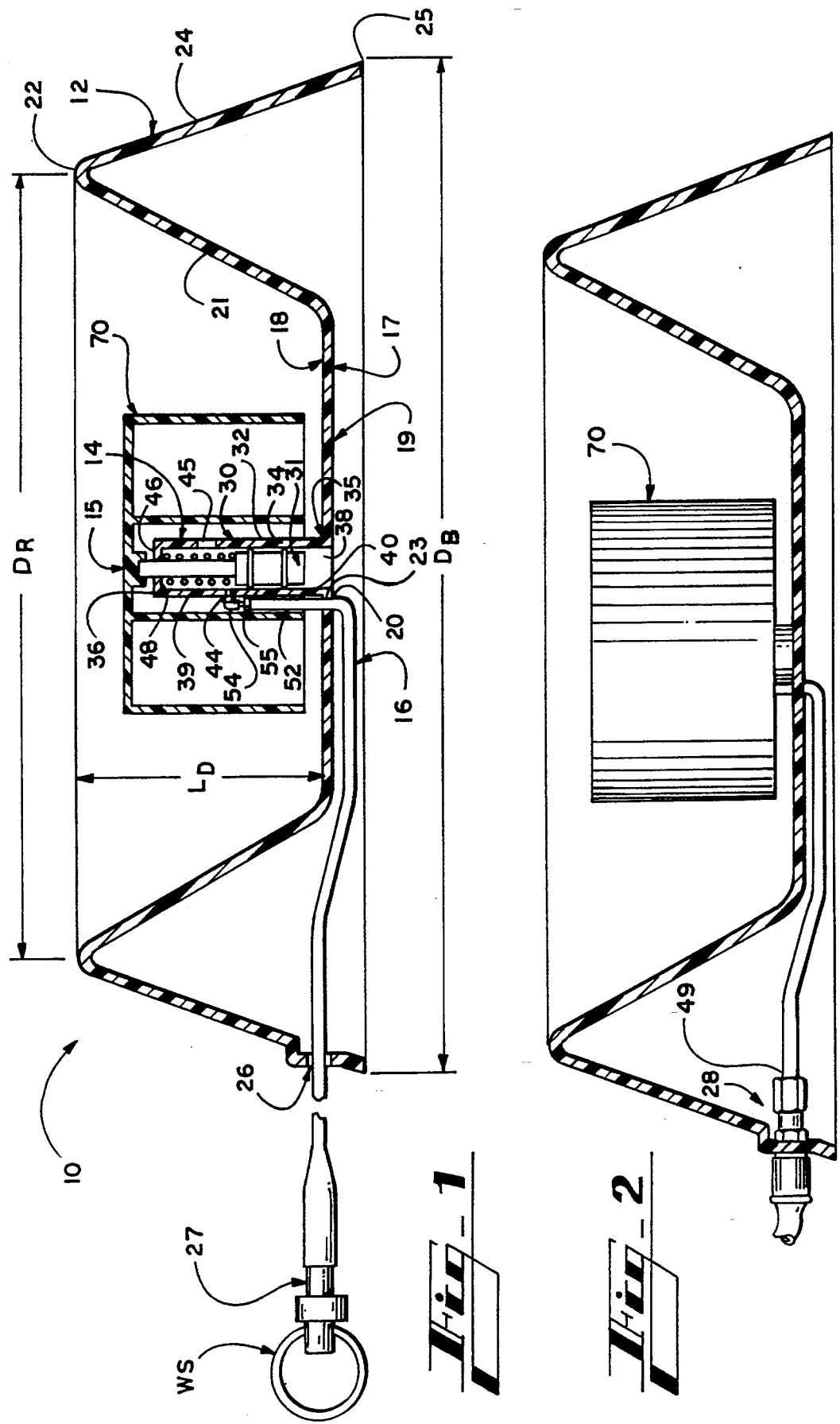

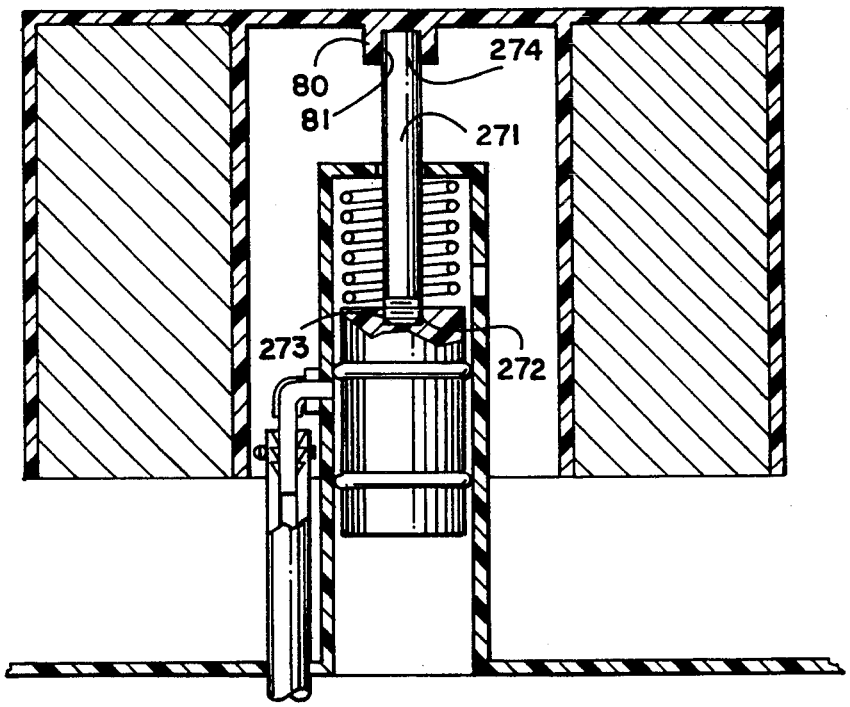
Fig_5
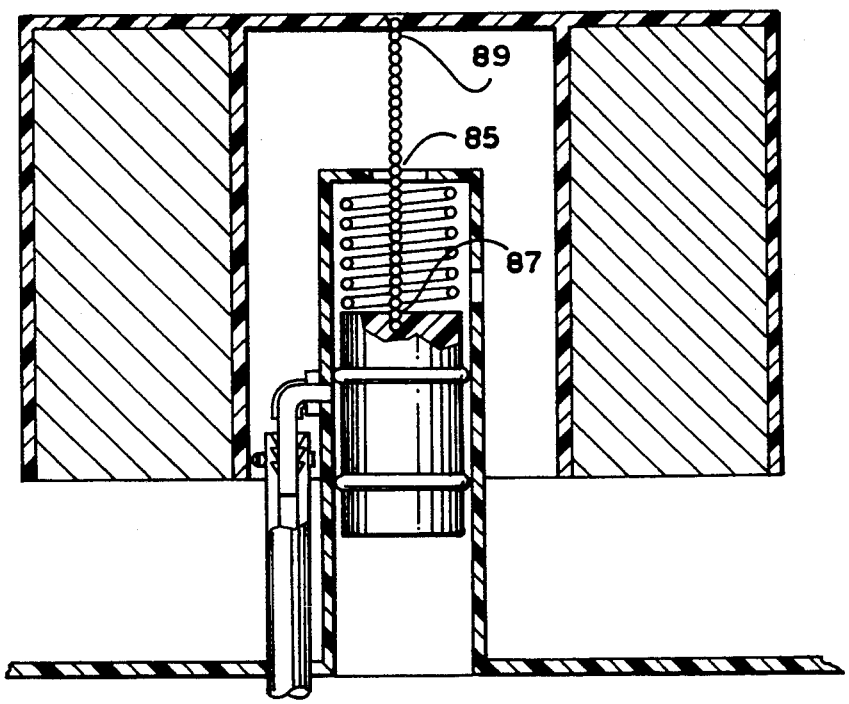
Fig_6

PET WATERING BOWL

FIELD OF THE INVENTION

This invention relates to a fluid control valve system, and more particularly to a fluid control valve for use with a reservoir to provide a maintained level of a fluid. Also provided is a method for maintaining a level of fluid in a reservoir.

BACKGROUND OF THE ART

When animals are kept as domestic pets or farm animals and the like, there is a need to provide them with a supply of fresh water for drinking. The water is usually contained in a reservoir, such as a trough or a bowl, which is typically made accessible to the animal so that the animal can drink water when ever it so desires. The water level in the reservoir will fall as the water is consumed by animals and/or by evaporation until the reservoir is completely empty. As the water is consumed it may become stagnant or unsanitary if not resumed or the concentration of existing and introduced contaminants increases as the water level decreases.

Thus, concerns of ready availability and cleanliness of animal drinking water require that the water reservoir be filled or nearly filled with fresh water at all times. This may be accomplished by several methods. These methods include, for example, maintaining a constant flow or trickle type system to fill the reservoir, manual filling or employing automatic control devices for sensing the level of water in the reservoir and actuating a flow control valve to replenish the water in real time or after the level has dropped to a certain predetermined level.

The constant flow method is often wasteful due to overflow that occurs and leads to untidy and possibly unsanitary conditions around the watering reservoir. Manually filling the reservoir when necessary is effective but time consuming and inconvenient. Using automatic control devices, then, is a practical solution to the problem of maintaining a level of water in a watering reservoir.

Automatic fluid level control devices are well known in the art. Several of these devices include float and valve mechanisms that typically employ a float to sense the level of water in a reservoir and actuate the valve mechanism by mechanically transmitting the buoyancy forces exerted on the float to the valve mechanism to open and close the valve to replenish water in the reservoir. The prior art control devices include, among other elements, a beam supported at a mechanical pivot point on a pivot pin with a float mounted at one end of the beam and an operative portion of the valve apparatus at the other end. The mechanical advantage provided by the beam is utilized to enhance shut off forces applied to the valve.

These devices are effective at controlling the level of a fluid in a reservoir; however, they tend to be difficult to adjust because of the long length of the beam necessary to generate proper shut-off forces and variations in water supply pressures that exist for a given application. The long beam length also prevents these devices from being small or compact since their size is somewhat determined by the length of the beam mechanism. The float and beam designs also are particularly susceptible to perturbations or rapid changes in the water level which may occur while an animal consumes water. Since valve sealing is enhanced by the buoyancy forces acting on the float, those forces being a function of the water level, changes in water level that can result from perturbations of the water may cause the valve to unseal and allow water to overfill the reservoir. The float and beam devices also tend to be mechanically complicated due to the mechanical linkages and the many parts required by their design and thus also tend to be relatively expensive. It would be desirable to have a watering reservoir including an automatic control device to sense the level of water in a reservoir and to actuate a flow control valve to maintain the level of fresh water in the reservoir that is simple in design and low in cost, relatively insensitive to perturbations in the water level and water supply pressure levels and easily adjustable to provide a desired fluid level in reservoirs of various sizes and shapes.

SUMMARY OF THE INVENTION

Generally described, the present invention provides an automatic flow control valve which is simple in design, low in cost, relatively insensitive to perturbations in the water level and water supply pressure and easily adjustable. A first preferred embodiment of the present invention comprises a reservoir having a bottom portion and an upwardly extending sidewall portion defining an internal volume therein, a conduit for supplying fluid from a fluid source to the reservoir and a valve, controlled by an actuator, for controlling the flow of water from the water supply into the reservoir so as to maintain a desired level of water in the reservoir. The valve includes an elongated tubular valve body having a sidewall and a central bore therethrough, an inlet aperture and an outlet aperture located in the sidewall with the inlet aperture in fluid communication, whereby the conduit means and the outlet aperture are in fluid communication with the inlet aperture and the reservoir. The valve also includes a valve shuttle assembly having a valve shuttle body disposed within the central bore of the tubular valve body and axially translatable within the tubular valve body. The valve shuttle includes a seal means which defines a sealing region which is in sealable and sliding engagement with the sidewall of the valve body adjacent to the central bore and is capable of occluding the inlet aperture when the inlet aperture is caused to be disposed wholly within the sealing region so as to prevent the flow of fluid through the inlet aperture. The actuator includes a float which floats on the surface of the water in the reservoir and which is interconnected to the shuttle body to cause the shuttle body to move axially within central bore between a first position and a second position in response to the level of fluid in the reservoir. In the first position the fluid flows through the conduit means and the inlet aperture, out the outlet aperture and into the reservoir. In the second position the inlet aperture is occluded by the sealing means to stop the flow of water into the reservoir.

An alternative embodiment of the claimed invention comprises the above described valve and actuator means used in combination with an existing reservoir where the actuator may be adjusted to accommodate the particular height of the reservoir side wall.

The method of the claimed invention includes providing a reservoir in which a level of liquid is maintained, providing a source of liquid for filling the reservoir, providing a valve means for controlling the flow of liquid from the source into the reservoir, providing an actuator means for actuating the valve means and sensing the level of liquid in the reservoir to cause the liquid to flow into the reservoir when the liquid level is below a predetermined level by turning the valve on to cause the liquid to flow into the reservoir and then to turn the valve off when the liquid level is above a predetermined level in the reservoir.

Thus, it is a principal object of the present invention to provide a fluid reservoir which will automatically replenish water so as to maintain a desired water level in the reservoir.

It is another object of the invention to provide a fluid reservoir that is relatively insensitive to perturbations of the water level in the reservoir.

It is still another object of the invention to provide a pet watering reservoir that is relatively insensitive to supply water pressure.

It is still another object of the invention to provide a pet watering reservoir that is simple in design and easy to construct and is inexpensive.

It is another object of the invention to provide a pet watering reservoir that provides a valve means and an actuator means to actuate the valve means which is adaptable to a variety of preexisting reservoirs.

Other objects, features and advantages of the present invention will become apparent upon reading the following detailed description of embodiments of the invention, when taken in conjunction with the accompanying drawings and the appended claims.

BRIEF DESCRIPTION OF THE DRAWINGS

The invention is illustrated in the drawings in which like reference characters designate the same or similar parts throughout the figures of which:

FIG. 1 is front cross-sectional view of a preferred alternative embodiment of pet water bowl of the claimed invention;

FIG. 2 is a view similar to FIG. 1 showing an alternative embodiment of a water supply connector;

FIG. 5 is a front elevational view of the water bowl of FIG. 1 showing a threaded interconnect stem;

FIG. 6 is a front elevational view of the water bowl of FIG. 1 showing a chain interconnect member;

Figure 3:
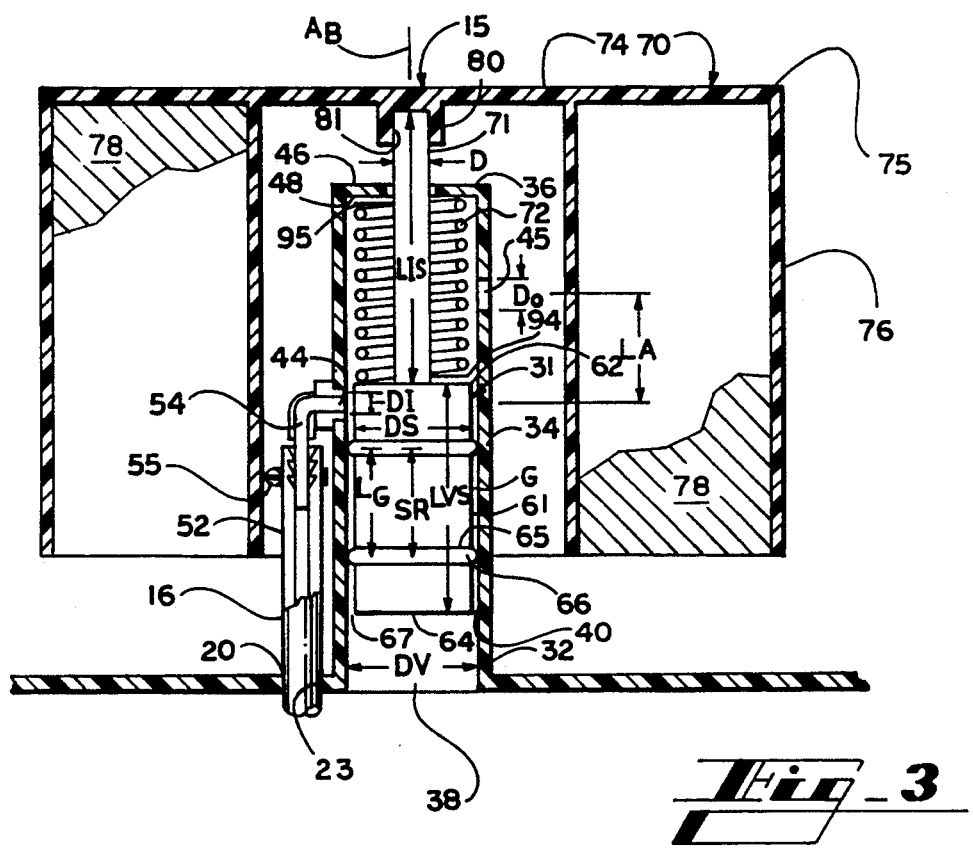
FIG. 3 is a front cross-sectional view of the valve and float assemblies of the claimed invention showing the valve in its "ON" position.

These figures and the following detailed description disclose specific embodiments of the invention, however, it is to be understood that the inventive concept is not limited thereto since it may be embodied in other forms.

DESCRIPTION OF THE PREFERRED EMBODIMENTS

FIG. 1 shows a preferred embodiment of an apparatus 10 according to the present invention. The apparatus 10 includes a generally circular reservoir 12, a valve assembly 14 supported by the reservoir 12 and an actuator assembly 15 operatively interconnected with the valve assembly 14. A water supply tube 16 is provided to supply fresh water from an external source and is in fluid communication with the valve assembly 14 which will be explained more completely below.

The reservoir 12 comprises a bottom portion 17 having an interior surface 18 and an exterior surface 19. The bottom portion 17 includes an aperture 20 defined by an aperture sidewall 23 adjacent to the valve assembly 14 which extends through the bottom portion 17 between the interior and exterior surfaces 18 and 19, respectively, and is sized to receive the water supply tube 16 therethrough. The reservoir also includes a sidewall portion 21 upwardly extending from the bottom portion 17 and which defines an upper perimeter rim 22 having an upper rim diameter $D_R$ and a reservoir depth $L_D$. The reservoir 12 also includes an exterior skirt 24 which extends downwardly and outwardly from the perimeter rim 22 of the sidewall 21 and defines a base perimeter rim 25 having a base diameter $D_B$ which is preferably, although not mandatorily, greater than the rim diameter $D_R$. The larger base diameter $D_B$ provides additional tip resistance to the apparatus 10 by lowering the center of gravity of the apparatus 10. The base perimeter rim 25 also extends lower than the bottom portion 17 to provide clearance for the water supply tube 16 to run beneath the bottom portion 17. The water supply tube 16 extends beyond the exterior skirt 24 through a tube cut-out 26 in the skirt 24. The water supply tube 16 is adapted to a water supply via a water supply barb fitting 27 disposed in fluid tight communication with a water supply conduit WS in a conventional manner. Alternatively, the water supply tube 16 may be disposed in fluid communication with a water supply connector 28 mounted to the exterior skirt 24 adjacent to the base perimeter rim 25, as shown in FIG. 2. The water supply connector 28 may be of any conventional type, but in the embodiment shown in FIG. 1 it is an American National Standards Institute ANSI-NHR hose coupling of the type most often used with outdoor garden hose couplings. It is to be understood that many reservoir shapes and designs can be utilized with the present invention. Furthermore, it is understood that fluids other than water can be used, such as solvents, oils and the like.

The valve assembly 14 includes a valve body 30 and a valve shuttle assembly 31. The valve body 30 comprises an elongated valve tube 32 extending perpendicularly from the bottom portion 17 and having a cylindrical sidewall 34 and opposed first and second open ends 35 and 36, respectively. The cylindrical sidewall 34 defines a valve body central bore 38 having a diameter $D_v$ and a longitudinal bore axis $A_B$ therethrough. The cylindrical sidewall 34 also includes an outer surface 39 and an inner sealing surface 40. In the preferred embodiment shown in FIG. 1, the valve body 30 is shown as an integrally molded portion of the bottom portion 17 with the central bore in fluid communication with the exterior surface 19 of the bottom portion 17. This is necessary since the central bore 38 must be vented to prevent a shuttle immobilizing vacuum or high pressure in the central bore 38 vent in response to upward and downward movement of the valve shuffle 60.

As shown in FIG. 3, the cylinder sidewall 34 defines a plurality of spaced apart apertures extending between the tube outer surface 39 and the tube inner sealing surface 40 which include a water inlet aperture 44 having a diameter DI and a water outlet aperture 45 having a diameter $D_o$ spaced above the inlet aperture 44 by a predetermined distance which is greater than the inlet orifice diameter $D_I$. Adjacent to the second open end 36 there is formed an inwardly radially extending shoulder 46 to provide a spring engaging surface 48, the significance of which will be described below.

The water supply tube 16 includes a supply connection end 49 and a valve connection end 52. The supply connection end 49 is adapted to be in fluid communication with the water supply barb fitting 27 or the water supply connector coupling 28. As described briefly above, the water supply connection tube 16 is caused to be passed through the aperture 20. It is necessary that the supply tube 16 be in sealing engagement with the aperture sidewall 23 of the aperture 20 so that water will not leak out of the reservoir 12 through an annular gap existing between the supply tube 16 and the aperture sidewall 23. To prevent leaking, the supply tube 16 may be fabricated of a tube having a diameter slightly greater than the diameter of the aperture 20 and capable of plastic deformation. Thus, the plastically deformable supply tube 16 is caused to be passed through the aperture 20 creating a fluid tight interference fit between the supply tube 16 and the aperture sidewall 23. Alternatively, where the water supply tube 16 is of a diameter smaller than the aperture 20 the tube may be disposed through the orifice 20 and sealed thereat by appropriate means including sealants, caulks and the like. A predetermined length of the valve connection end 52 of the supply tube 16 extends above the inner surface 18 of the bottom portion 17 and engages a fight angle barb fitting 54 which engages the inlet aperture 44 to place the water supply tube 16 in fluid communication with the central bore 38. The valve connection end 52 is further secured to the barb fitting 54 by a hose clamp 55.

The valve shuttle assembly 31 includes an elongated round valve shuttle 60 having a shuttle length $L_{VS}$ and diameter $D_s$ slightly smaller than the valve body bore diameter $D_v$ so that the shuttle 60 will be capable of axial movement within the central bore 38 of the valve tube 32. The valve shuttle 60 defines an external sealing surface 61 and an upper end 62 and lower end 64. The valve shuttle body includes a plurality of spaced apart, circumferentially extending grooves 65, each sized to receive an "O" ring 66 thereabout. The "O" rings 66 provide a means for causing sealing engagement between portions of the external sealing surface 61 of the valve shuttle 60 and the tube inner sealing surface 40. The "O" ring serves a secondary function of supporting the shuttle 60 coaxially within the central bore 38 to form an annular gap 67 between the external sealing surface 61 and the tube inner sealing surface 40. The spaced apart relationship of the grooves 65 with "O" rings thereabout defines a sealing region SR equal in length to the groove center-to-center distance $L_G$ which must be greater than the diameter $D_I$ of the inlet aperture 44.

The actuator assembly 15 includes a float 70, an interconnect stem 71 and a spring 72. The float 70 comprises a generally circular top portion 74 defining an outer rim 75, a circumferentially extending exterior sidewall 76 extending downwardly from the outer rim 75 and a circumferentially extending interior sidewall 77 extending downwardly from an intermediate position of the top portion 74. The interior and exterior sidewalls 76 and 77 cooperate to define an annular buoyancy chamber 78 therebetween. The float 70 also includes a stem mounting boss 80 which defines a mounting aperture 81 therein.

Figure 4:
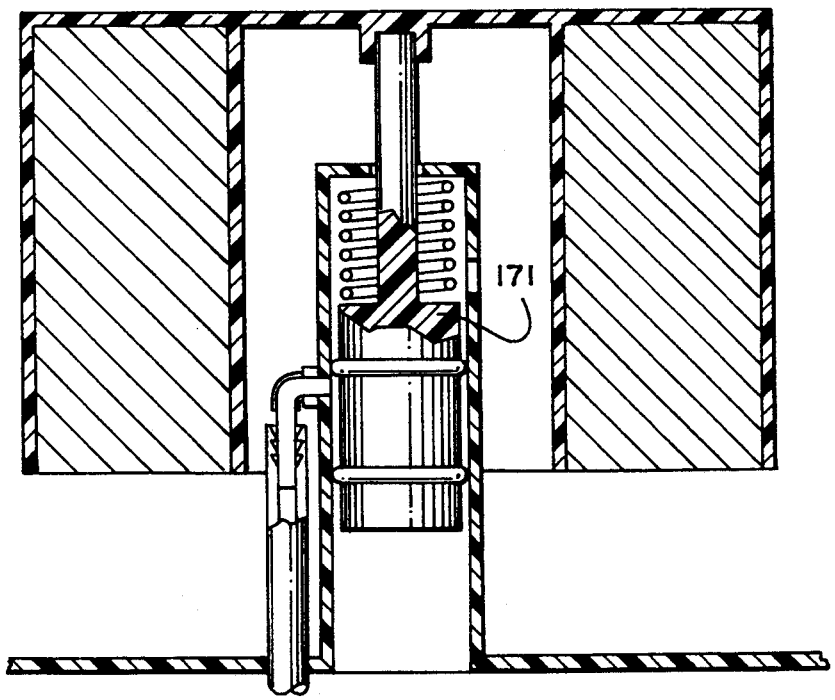
FIG. 4 is a front elevational view of the water bowl of FIG. 1 showing an integral interconnect stem.
Figure 7:
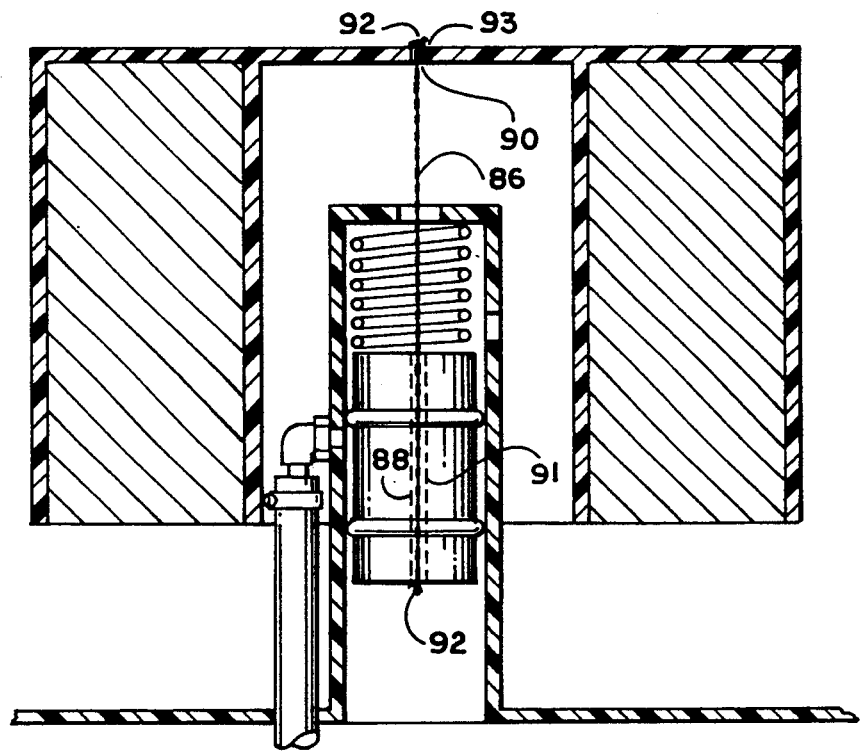
FIG. 7 is a front elevational view of the water bowl of FIG. 1 showing a filament interconnect member.

The interconnect stem 71 is adapted to mechanically interconnect the float 70 to the shuttle 60 so that motion of the float 70 will be transferred to the shuttle 60. As shown in FIG. 4, the interconnect stem 71 comprises an elongated round rod having length $L_{IS}$ and diameter $D_S$. The valve stem length $L_{IS}$ is, in the preferred embodiment, adjustable, to accommodate desired fluid levels in the reservoir 12 and dimensional characteristics of other elements of the watering apparatus 10 which will be explained more fully below. Several means exist to effect the mechanical coupling of the shuttle 60 to the float 70. In an alternative embodiment shown in FIG. 5, the interconnect stem is shown as a threaded interconnect stem 271 and includes a first end 272 provided with a threaded portion 273 and an opposed end portion 274 sized and adapted to be received within the mounting aperture 81 of the float boss 80. A third means for mechanically coupling the float 70 to the valve shuttle 60 is to provide a non-rigid interconnect structure which may include, for example, a chain interconnect member 85 or a filament interconnect member 86 which are shown in FIGS. 6 and 7, respectively. The chain 85 and filament 86 include shuttle attaching ends 87 and 88, respectively, and opposed float attaching ends 89 and 90, respectively. The shuttle attaching ends 87 and 88 and the float attaching ends 89 and 90 are caused to be secured to the valve shuttle 60 and the float 70, respectively. The means for securing the ends 87, 88, 89 and 90 could include the use of mechanical engaging means or adhesives or potting compounds or a combination thereof commonly known in the art. For example, where a filament interconnect means 86 is used it may be secured by disposing the filament through a longitudinally extending aperture 91 defined through the shuttle 60 between the upper end 62 and the lower end 64 and secured adjacent the lower end 64 by a knot 92 tied in the shuttle attaching end 88 of a sufficient size to be unable to pass back through the aperture 91. The opposing end 90 could be secured similarly through an aperture 93 disposed in the top portion 74 of the float 70. The filament ends 88 and 90 could, alternatively, be secured to the shuttle 60 and the float 70 by gluing the respective ends in place at the upper end 62 in a suitable aperture thereat at the float mounting aperture 81. The length of the filament between the ends 88 and 90 is a predetermined length which cooperates with the height of the sidewall portion 21 of the reservoir 12 and which will be more fully explained below.

The spring 72 of the actuator assembly is a helical compression spring having opposed ends 94 and 95 and a predetermined length $L_S$ and which is disposed within the central bore 38 of the valve body 30 between the second open end 36 and the valve shuttle 60 and biased in the extended position. As shown in FIG. 3 the spring ends 94 and 95 are disposed in compressive engagement between the shuttle upper end 62 and the spring engaging surface 48 of the shoulder 46. In the preferred embodiment, the ends 94 and 95 are closed and ground so that the ends engage the shuttle 60 and spring engaging surface 48 uniformly to prevent wear and provide uniform operation of the valve assembly 14. In an alternative embodiment, the spring 72 could be a tapered helical spring which has a non-working or solid height equal to a single wire diameter. This may be useful where the overall height of the watering apparatus 10 is important.

Alternative embodiments falling within the scope of the claimed invention include but are not limited to alternative floats, sealing means adapted to the shuttle and valve assembly 14 configuration.

Figure 8:
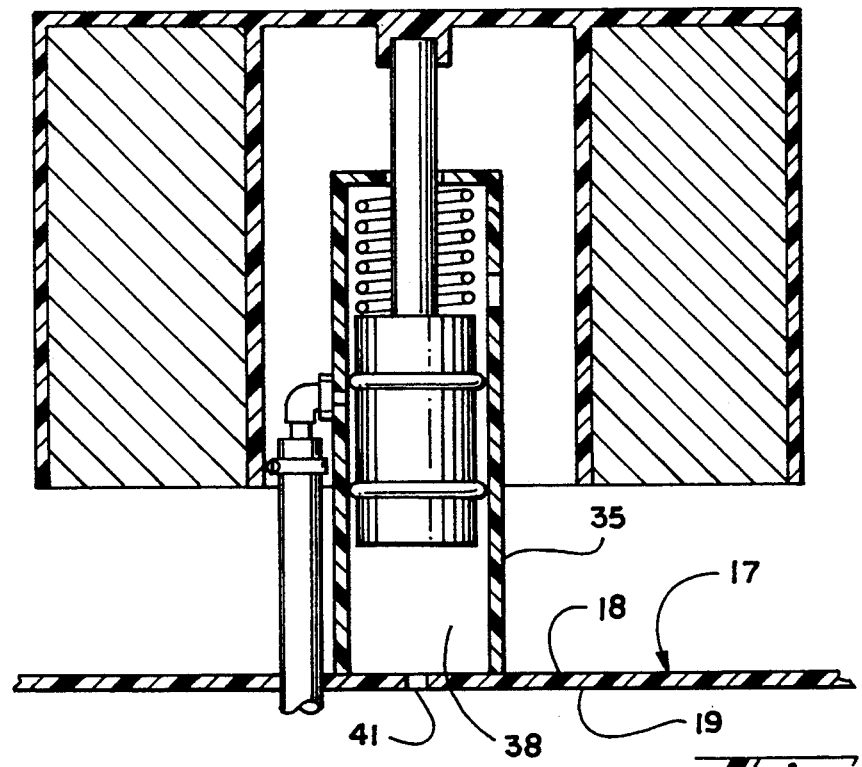
FIG. 8 is a front elevational view showing a preferred embodiment of the valve body shown in FIG. 3.
Figure 9:
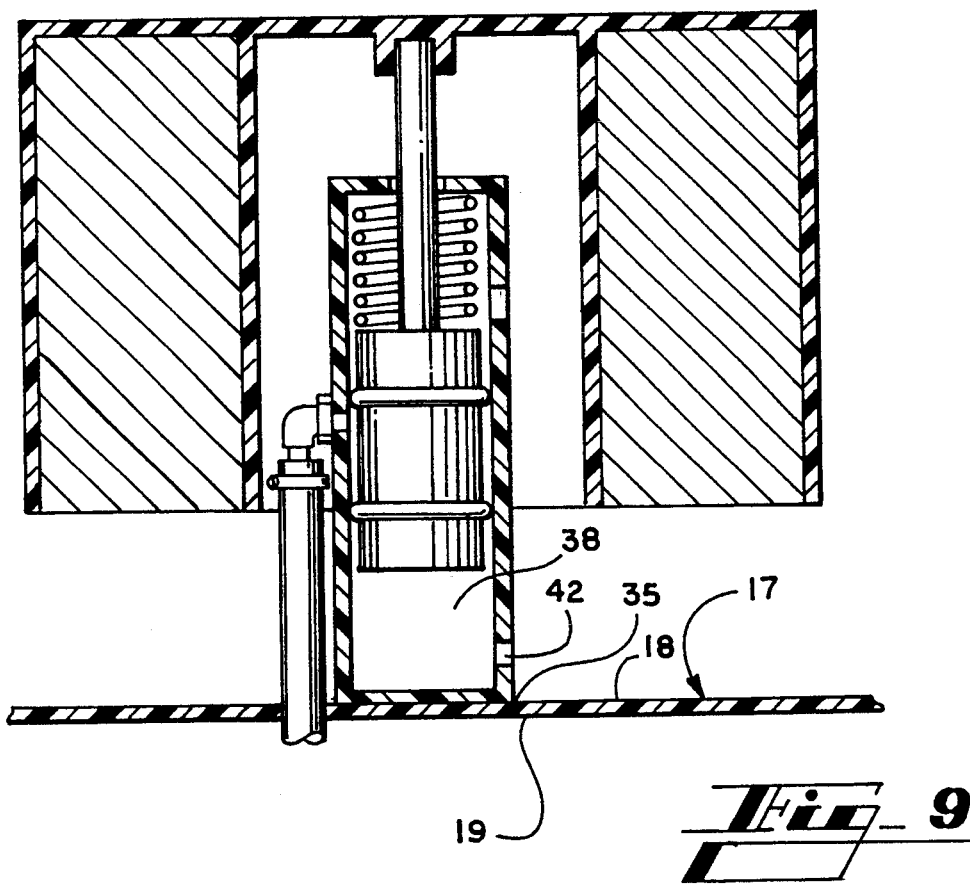
FIG. 9 is a front elevational view showing an alternative embodiment of the valve body shown in FIG. 3.

In an alternative embodiment shown in FIG. 8, the valve body 30 is provided as a separate element having the first end 35 supported and adhered to and in fluid tight engagement with the bottom portion 17. In this embodiment the central bore 38 communicates with the exterior surface 19 of the bottom portion 17 through an aperture 41 defined in the bottom portion 17. In still another alternative embodiment shown in FIG. 9 the first end 35 of the valve body 30 is a closed end which is in supported and adhered in engagement with the bottom portion 17. In this embodiment, the valve body defines a vent aperture 42 adjacent the first end 35 to allow the central bore 38 to vent in response to upward and downward movement of the valve shuttle 60 which is necessary to prevent shuttle immobilizing vacuum or pressure in the central bore 38.

Figure 10:
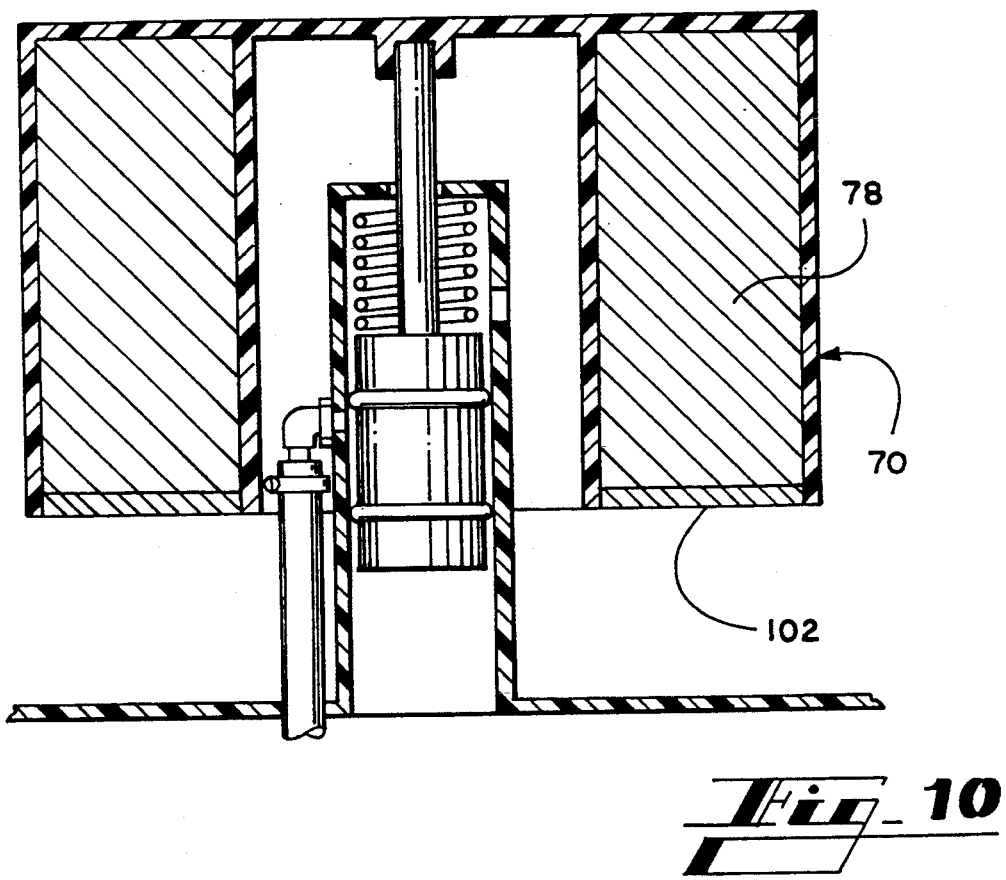
FIG. 10 is a front elevational view showing a preferred embodiment of the float shown in FIG. 3.
Figure 11:
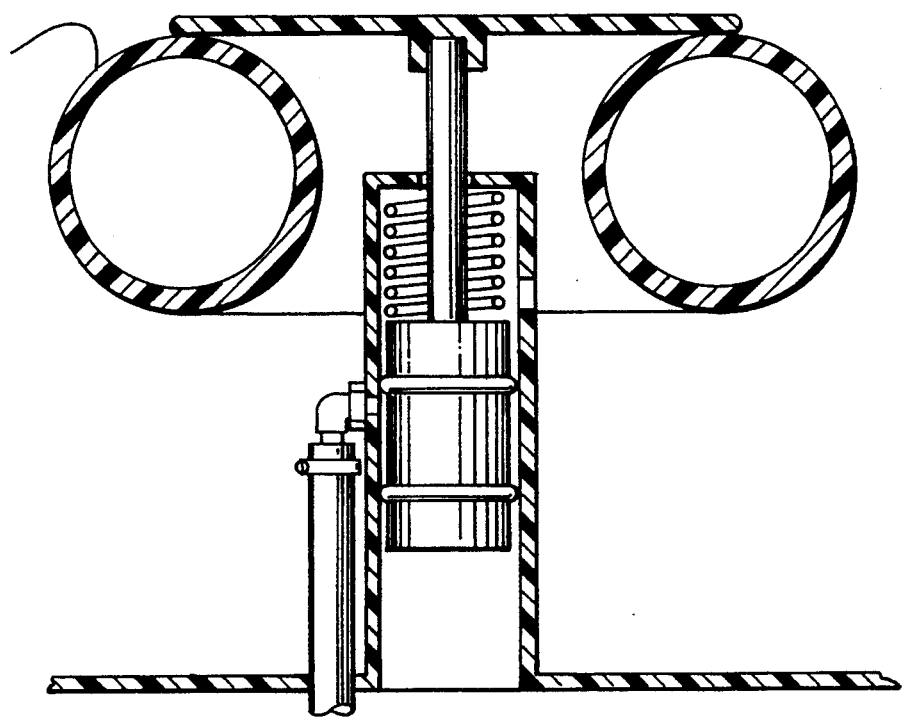
FIG. 11 is a front elevational view showing a second alternative embodiment of the float shown in FIG. 3.
Figure 12:
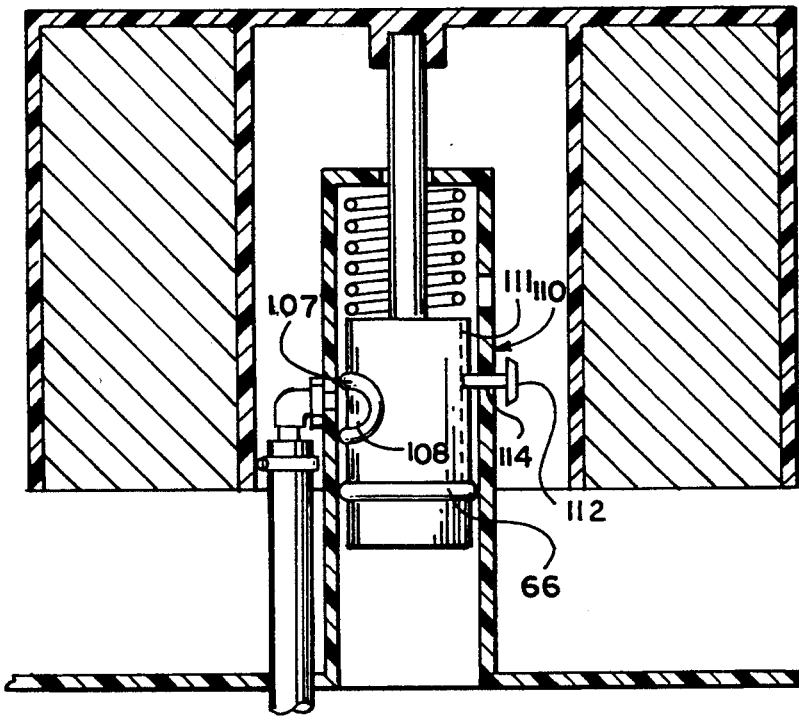
FIG. 12 is a front elevational view of the valve assembly shown in FIG. 3, showing a preferred sealing means.

Shown in FIGS. 10, 11 and 12 are alternative embodiments of the float 70. FIG. 10 shows a float 70 with a bottom panel 102 which closes the annular buoyancy chamber 78 to make it a sealed buoyancy chamber. This may be desirable where the fluid in the reservoir remains for long periods of time unconsumed and with low evaporation, conditions under which air trapped in the open chamber 78 could be absorbed into water thus allowing water to replace enough trapped air so as to reduce the buoyancy forces generated by the float 70. If that condition were to exist the valve would be no longer self regulating, allowing water to overflow the top of the reservoir upper perimeter rim 22.

Alternatively, the float 70 with the annular buoyancy chamber 78, can be filled with a buoyant material, such as, but not limited to, closed cell urethane foam 103. The effect and benefit of adding the foam is similar to that of providing the bottom panel 102 hereinbefore described.

FIG. 11 illustrates the use of a hollow, donut shaped buoyancy member 104 interconnected to the interconnect stem 71 by a cross member 105 which rigidly mounts the buoyancy member 104 to the stem 71. Member 104 can alternatively be filled with the buoyant material 103.

An alternative embodiment for a sealing means adapted to the valve shuttle is shown in FIG. 12, wherein the shuttle is adapted to receive two "O" rings, a first "O" ring being substantially the same is "O" ring 66 and a second "O" ring 107 which is dissimilar to "O" ring 66. "O" ring 66 serves the purpose of sealing the shuttle 31 to the tube inner sealing surface 40 to prevent flow of water through the annulus between the shuttle and inner sealing surface and out the bottom through the aperture 41. "O" ring 107 circumscribes a circular sealing region 108 which must be slightly greater than the inlet aperture diameter D1 so that complete sealing is effected about the inner sealing surface 40 adjacent the aperture 44. Anti-rotation means 110 for preventing rotation of the shuttle 31 within the valve body 30 to allow proper registration of the "O" ring 107 adjacent to the aperture 44 is provide to insure proper functioning of the valve 14. This may be accomplished by forming a longitudinally extending groove 111 on a portion of the external sealing surface 61 and disposing a pin 112 through an aperture 114 defined in the valve body sidewall 21 in sliding engagement with the groove which will prevent rotational, but not longitudinal, motion of the shuttle 31 relative to the valve body 30 is prevented.

Figure 13:
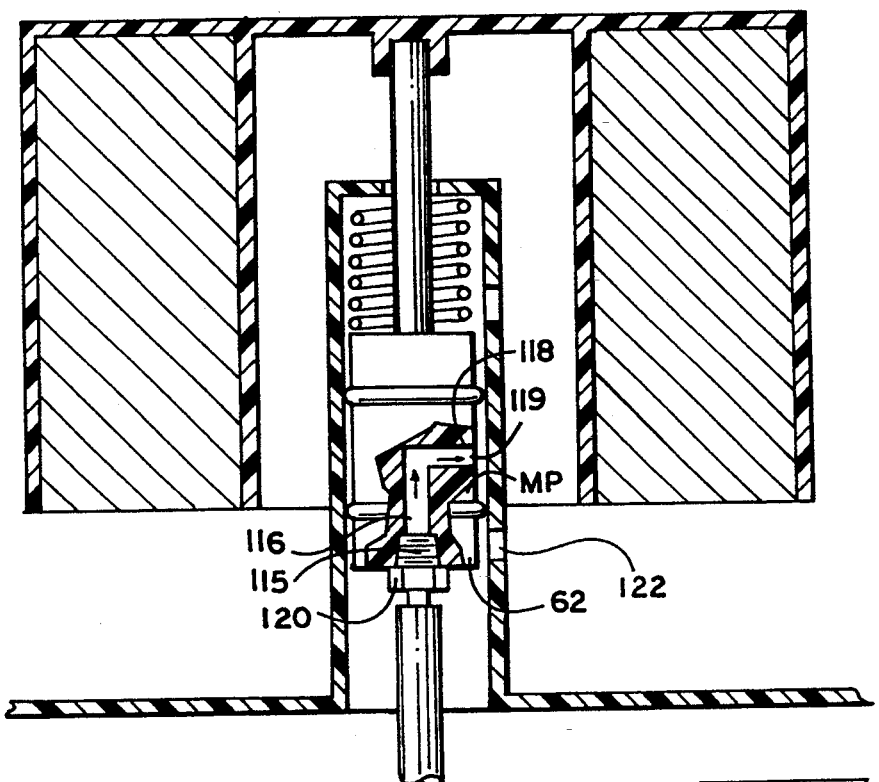
FIG. 13 is a front elevational view of the valve assembly shown in FIG. 3, showing a alternative sealing means; and, FIG. 14 is a front elevational view of the valve assembly of FIG. 3 showing a manual shut-off means.

An alternative embodiment of the valve assembly 14 configuration is shown in FIG. 13. The shuttle 31 having a central axis $A_s$, shown in FIG. 4, includes a water inlet 115 defining an inlet aperture 116 disposed in the shuttle lower end 62 extending longitudinally and substantially parallel to the shuttle central axis $A_s$. A water outlet 118 defining an outlet aperture 119 is disposed at a midportion MP that the two apertures 116 and 119 intersect putting them in fluid communication with one another. A hose fitting 120 to which the valve connection end 52 of the water supply tube 16 is attached and in communication therewith is caused to be disposed in water tight engagement with the water inlet 115 and in fluid communication with the inlet and outlet apertures 116 and 119. Whereas in the previously described embodiment of the valve assembly 14 the valve body included inlet and outlet apertures 44 and 45, the valve body 30 in this alternative embodiment need only be provided with a single outlet aperture 122 defined in the cylindrical sidewall 34 and positioned below the lower most groove 65 when the reservoir is in the full condition. Thus, the sealing region defined between the "O" rings 66 is caused to be disposed in fluid communication when the float and shuttle assembly experience downward motion sufficient to move the sealing region in registration with the outlet aperture 122. As the reservoir fills, upward motion of the float and shuttle cause the sealing region to move out of registration with the outlet aperture 119 so as to cause the fluid communication to be discontinued.

Figure 14:
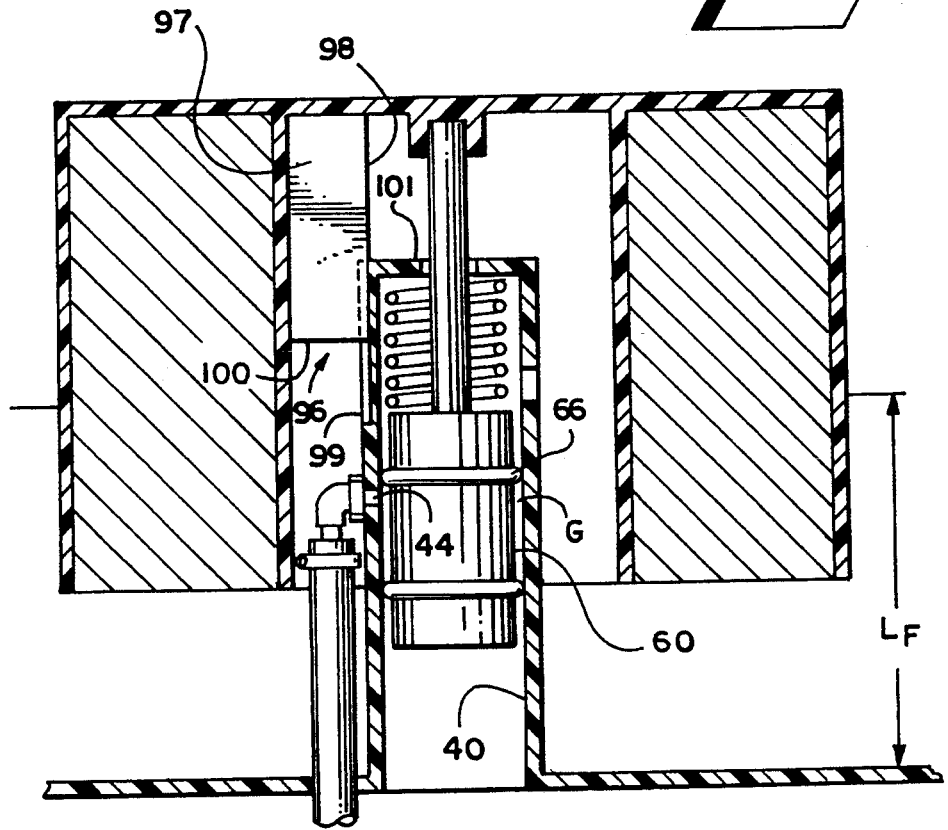

The apparatus of the preferred embodiment also includes manual shut-off means 96 for manually deactivating the automatic filing capability of the apparatus 10 as shown in FIG. 14. The manual shut-off means 96 includes a shut-off tang 97 projecting downwardly from the float top portion 74 and along the interior sidewall 77. The shut-off 97 tang includes a slot engaging edge 98 adapted to slidingly engage an shut-off slot 99 extending longitudinally along the exterior surface of the valve tube 32 and a support edge 100 adapted to engage an engaging surface 101 of the valve tube 32. As will be explained below the support edge 100 is engage able with the engaging surface 101 by raising the float 70 to a predetermined height to cause the engaging edge 98 to clear the slot 99 and then turned about the longitudinal axis of the interconnect stem 71 and released to cause the support edge 100 to engage the engaging surface 101 to cause the float to remain in a raised position to shut off the flow of water to the reservoir 12.

OPERATION

An initial condition of the watering apparatus 10 is shown in FIG. 3 where it can be seen that no water is held in the reservoir 12 and the valve shuttle 60 and the float 70 are at there lowest points of travel and the spring 72 is in its most distended position and there even may be a space between the upper end 95 of the spring 72 and the spring engaging surface 48. In this position the float 70 may be resting on the interior surface 18 of the bottom portion 17 of the reservoir 12. The upper end 62 and the upper groove and "O" ring 66 of the shuttle 60 is in position well below the lower edge of the inner sidewall surface that defines the inlet aperture 44 and thus is in the "ON" position.

To initially fill the reservoir 12, the apparatus 10 is connected to the water supply WS via the water supply tube 16 connected to the water supply barb fitting 27 or by attaching a garden hose male end connector to the water supply connector coupling 28. The water supply is turned on so as to cause water to be delivered to the watering apparatus through the water supply tube 16. The water enters the barbed fitting 54, fills the central bore 38 and then exits through the outlet valve body aperture and the valve body second end 36 through the annular gap between the interconnect stem 71 and the shoulder 46. The water commences to fill the reservoir 12. As the water level begins to rise in the reservoir 12, the water, which is exposed uniformly to the underside of the float 70, begins to enter the exposed open annular buoyancy chamber 78 and compresses the air inside. When the compressive force equals and then exceed the sum of forces acting on the float 70 the float 70 begins to rise. The component forces acting on the float 70 include the weight of the float 70, interconnect stem 71, spring 72, shuttle 60 and "O" rings 66. In addition, friction forces caused by the engagement of the "O" rings and the inner sealing surface 40 must be included as a component as well as any preloaded spring forces if the ends 94 and 95 of the spring 72 are in engagement with the upper end 62 and the spring engaging surface 48. Once the float 70 and shuttle assembly 31 begin their upward travel, the incremental force necessary to be overcome includes the progressively increasing spring force which is a function of the spring constant k and the deflection δ of the spring and back pressure caused by above-atmospheric pressure existing in the central bore 38. Preferably, the back pressure is minimized by causing the outlet aperture 45 area to be relatively large compared to the inlet aperture 44 area. It is also important to note that as the shuttle moves upwardly within the central bore 38, vent air enters the first open end 35 of the valve body or the aperture 41 depending on the particular apparatus construction.

As water continues to fill the reservoir 12 and the float 70 and valve shuttle 60 rise in the central bore, the upper sealing "O" ring 66 approaches the inlet aperture 44. FIG. 14 shows the apparatus 10 in an "OFF" position, wherein the "O" ring moves laterally past the aperture 44 and then sealingly engages a portion of the inner sealing surface 40 that defines the upper most circumferential portion of the inlet aperture 44. At this point the aperture 44 is in registration with and completely disposed within the sealing region SR defined between the "O" rings 66 and the water level will be. A small quantity of water continues to flow into a portion of the annular gap G defined between the shuttle external sealing surface 61 and the tube inner sealing surface 40 and bounded by the "O" rings 66 and when filled, the water flow stops since the water cannot escape past either of the "O" ring interfaces.

When the reservoir 12 is full and water is no longer flowing through the valve assembly 14 there exists a balance of forces between the spring forces, urging the shuttle 60 toward a valve "open" state and the buoyancy forces provided by the float 70 which are urging the shuttle into a valve "closed" state. As the water level decreases the float 70 drops, decreasing the buoyancy forces in proportion to the spring forces which urge the shuttle 60 downward and eventually causes the valve to open at which point water flows through the valve assembly 14 and into the reservoir 12. In the preferred embodiment the float 70 is a light weight float which is less expensive to manufacture and sell. It should be understood that the weight of the float alone might not be sufficient to overcome the initial frictional forces, also called stiction forces, and the average frictional forces of the "O" rings 66 engaged with sealing surface 40. The mass of the float 70 could be increased and thereby obviate the requirement for a spring; however, including a heavy float 70 increase manufacturing costs and changes the dynamic response of the float to varying water levels since the spring forces are reduced proportional to the displacement of the float 70, whereas the float mass and forces exerted thereby remain constant. The consequence is that the required amount of travel or the size of the float must be increased to accomplish valve open-valve closed state changes for a given reservoir size and fluid level. Also, a heavier mass float would have greater momentum swings when the float was subjected to perturbation in the water level which may cause the valve to cycle on and off resulting in reservoir overflow. A reservoir utilizing a low mass float and spring assembly would be less susceptible to perturbations.

The apparatus may be manually shut-off by lifting the float 70 to artificially simulate a reservoir full state and engaging the manual shut-off means 96. This is accomplished by lifting the float 70 upwards so that the slot engaging edge 98 of the shut-off tang 97 moves upward and out of engagement with the slot 99. The float 70 is then turned to angularly displace the tang 97 from the slot 99 and to cause the support edge 100 to engage the engaging surface 101 of the valve body 30. The float 70 is held mechanically, but non-buoyantly, to place the valve assembly 14 in an "OFF" position so that water flow is prevented regardless of the level of water in the reservoir.

While the invention has been described in connection with certain preferred embodiments, it is not intended to limit the scope of the invention to the particular forms set forth, but, on the contrary, it is intended to cover such alternatives, modifications, and equivalents as may be included within the spirit and scope of the invention as defined by the appended claims.

What is claimed is:

1. Apparatus for providing a self maintained fluid level in a reservoir, said reservoir having a bottom portion and an upwardly extending sidewall portion a predetermined height above said bottom portion to define an internal volume therein, comprising:

conduit means for supplying fluid from a fluid source to said reservoir;

valve means supported by said reservoir and in fluid communication with said conduit means for controlling the flow of water from the fluid source into said reservoir, said valve means having:

a fluid inlet defining a fluid inlet aperture and a fluid outlet defining a fluid outlet aperture, said fluid inlet and outlet apertures being selectively capable of being disposed in fluid communication with said conduit means and said fluid reservoir, an elongated tubular valve body having a sidewall and defining a central bore therethrough in selective fluid communication with said fluid inlet and outlet apertures, said sidewall defining at least one fluid aperture through said sidewall in fluid communication with said central bore, and a valve shuttle in sealable and sliding engagement with said sidewall adjacent said central bore and axially translatable therealong and effective to control the flow of water from said fluid source through said inlet fluid aperture and said outlet fluid aperture and into said reservoir, wherein said valve shuttle includes an outer sealing surface and wherein said sidewall of said elongated tubular valve body defines an inner sealing surface adjacent said central bore, said valve shuttle further including sealing means, said sealing means including and a plurality of "O" rings spaced apart along said valve shuttle defining a sealing region effective to provide sealing engagement between said valve shuttle with said valve body; and, floatation means operatively interconnected to said valve means and effective to cause said valve spool to move axially within said central bore between a first position and a second position in response to the level of fluid in said reservoir such that in said first position said plurality of O-rings are positioned below said fluid inlet aperture such that said valve means is disposed in an open position to allow the fluid to flow from the fluid source and into said reservoir and in said second position said fluid inlet aperture is positioned between said at least two O-rings such that the flow of fluid from said inlet fluid aperture to said outlet aperture is stopped.

2. The apparatus of claim 1, wherein said valve shuttle includes an outer sealing surface and wherein said sidewall of said elongated tubular valve body defines an inner sealing surface adjacent said central bore, said valve shuttle further including sealing means, said sealing means including a plurality of spaced apart grooves defined in said valve shuttle adjacent said outer sealing surface and adapted to receive a resilient "O" ring seal therein, and a plurality of "O" rings, one of which is disposed in each of said plurality of grooves, said sealing means defining a sealing region effective to provide sealing engagement of said valve shuttle with said valve body.

3. The apparatus of claim 2, wherein said valve shuttle defines said fluid inlet aperture and a fluid passageway, wherein said fluid passageway is disposed in fluid communication with said fluid inlet aperture and said at least one fluid aperture through said sidewall.

4. The apparatus of claim 2, wherein said fluid aperture is said fluid inlet aperture defined by said sidewall of said elongate tubular valve body and wherein said fluid outlet aperture is defined by said sidewall of said tubular valve body such that said fluid aperture is disposed in fluid communication with said conduit means and said central bore of said tubular valve body and said fluid outlet aperture is selectively disposable in fluid communication with said fluid aperture of said tubular valve body and said reservoir.

5. The apparatus of claim 1, wherein said floatation means further includes spring means operatively associated with said valve shuttle and effective to urge said valve shuttle into said first position to place said valve means in an open position to allow the fluid to flow from the fluid source and into the reservoir.

6. An animal watering apparatus for providing water to an animal from a water supply for consumption comprising:

a reservoir having a circular bottom portion defining first and second apertures therethrough and a bottom diameter a sidewall portion extending upwardly and circumferentially from said bottom portion a predetermined height above said bottom portion to define an internal reservoir volume therein, and a sidewall skirt extending downwardly and outwardly from said sidewall and having a diameter greater than said bottom diameter so that the center of gravity of the reservoir is lowered to stabilize the reservoir to prevent tipping of the reservoir, and valve means in fluid communication with the water supply for controlling the flow of water from the water supply into said reservoir, said valve means including an elongated tubular valve body comprising a sidewall portion, said sidewall portion including an inner sealing surface thereon and defining a central bore therethrough adjacent said inner sealing surface, and opposed open first and second ends, said first end being supported by said bottom portion of said reservoir and in fixed and water-tight engagement therewith said central bore in fluid communication with said first bottom aperture and said second end extending from said bottom portion and substantially perpendicular thereto, and a spring engaging shoulder inwardly radially extending from said inner sealing surface adjacent said second end and defining a reduced stem aperture therethrough and a spring engaging surface thereon, said sidewall portion defining an inlet aperture and an outlet aperture therethrough, said inlet aperture having a predetermined inlet aperture diameter and being situated along a midportion of said sidewall and said outlet aperture being situated above said first aperture toward said second end of said tubular valve body a distance greater than said inlet aperture diameter, said inlet aperture being in fluid communication with said outlet aperture and said outlet aperture being in fluid communication with said reservoir, a valve shuttle including an elongated cylindrical shuttle body having an upper shuttle end and a lower shuttle end and disposed in sealable and sliding engagement with said inner sidewall of said tubular valve body to control the flow of water from said conduit means through said inlet aperture and out said outlet aperture and into said reservoir said valve spool defining first and second seal grooves extending circumferentially about said round spool body and spaced apart a distance greater than said inlet aperture diameter and further including first and second O-ring seals disposed in said first and second seal grooves and adapted to sealingly engage said valve spool with said inner sealing surface, said first and second ring seals being maintained in constant sealing engagement with said valve body sidewall;

a water supply arrangement including
- a water supply conduit having first and second water conduit ends, said water supply conduit situated generally beneath said bottom portion of said reservoir and having said second conduit end passing through said second bottom aperture and in water fight engagement with said bottom portion adjacent said aperture,
- a water supply inlet coupling in water tight engagement and in fluid communication with said first conduit end and connectable to an external supply of water, and
- a valve body fitting in water fight engagement and fluid communication with said second end of said water supply conduit and with said inlet aperture of said valve body; and, an actuator arrangement including
- a float comprising a circular top portion defining an outer rim, a circumferentially extending outer sidewall extending downwardly from said outer rim and a circumferentially extending interior sidewall extending downwardly from said top portion at an intermediate radial portion thereof, said outer sidewall, said interior sidewall and said top portion defining an annular buoyancy chamber therebetween, said float being capable of linear travel within said reservoir perpendicular to said bottom of said reservoir in response to the level of fluid in said reservoir and effective to place said valve arrangement alternately between off and on states;
- an interconnect stem engaged with and extending substantially perpendicularly from said top portion of said float and through said open second end of said elongate tubular body and engaging said upper shuttle end of said shuttle to mechanically link said float to said valve shuttle, and
- a helical spring coaxially disposed about said interconnect stem and having a first spring end disposed in compressive engagement with said spring engaging shoulder of said tubular valve body and a second spring end disposed in compressive engagement with said upper shuttle end and effective to urge said shuttle to said downward position within said central bore of said tubular valve body to cause said valve arrangement to be disposed in a closed position such that water does not flow into said reservoir, whereby said floatation means is operatively interconnected to said valve means and effective to cause said valve spool to move axially within said central bore between a first position and a second position in response to the level of fluid in said reservoir such that in said first position said at least two O-rings are positioned below said fluid inlet aperture such that the fluid can at least partially flow through said conduit means, through said inlet aperture, into said central bore and out the outlet aperture and in said second position said fluid inlet aperture is positioned between said at least two O-rings such that the flow of fluid from said inlet aperture to said outlet aperture is stopped.

7. An apparatus for providing a self maintained fluid level in a reservoir, said reservoir having a bottom portion and an upwardly extending sidewall portion a predetermined height above said bottom portion to define an internal volume therein, comprising:

conduit means for supplying fluid from a fluid source to said reservoir;

valve means in fluid communication with said conduit means for controlling the flow of water from said water supply into said reservoir, said valve means having
- a water inlet and an elongated tubular valve body having a sidewall and defining a central bore therethrough and having an inlet aperture and an outlet aperture defined in said sidewall, said inlet aperture being in fluid communication with said conduit means and said outlet aperture being in fluid communication with said inlet aperture and said reservoir, and
- a valve shuttle in sealable and sliding engagement with said sidewall adjacent said tubular bore to control the flow of water from said conduit means through said inlet aperture and out said outlet aperture and into said reservoir said valve shuttle having at least two O-rings disposed around the circumference of said valve shuttle defining a sealing region to provide leak-resistant sealing engagement of said at least two O-rings and said valve body; and, floatation means operatively interconnected to said valve means and effective to cause said valve spool to move axially within said central bore between a first position and a second position in response to the level of fluid in said reservoir such that in said first position said at least two O-rings are positioned below said fluid inlet aperture such that the fluid can at least partially flow through said conduit means, through said inlet aperture, into said central bore and out the outlet aperture and in said second position said fluid inlet aperture is positioned between said at least two O-rings such that the flow of fluid from said inlet aperture to said outlet aperture is stopped.

8. The apparatus of claim 7, wherein said floatation means includes: float means providing a buoyant structure for providing buoyancy forces to said valve shuttle when in buoyant contact with the fluid in said reservoir; an interconnect member operatively engaged with said float means and said valve shuttle and effective to transmit said buoyancy forces of said float to said valve shuttle; and, spring means in compressive engagement with said valve shuttle effective to urge said shuttle to said first position so that water flows into said reservoir.

9. The apparatus of claim 8, wherein said float means comprises a float having a circular top portion defining an outer rim, a circumferentially extending outer sidewall extending downwardly from said outer rim and a circumferentially extending interior sidewall extending downwardly from said top portion at an intermediate radial portion thereof, said outer sidewall, said interior sidewall and said top portion defining an annular buoyancy chamber therebetween, said float being capable of linear travel within said reservoir perpendicular to said bottom of said reservoir in response to the level of fluid in said reservoir and effective to place said valve arrangement alternately between off and on states.

10. The apparatus of claim 9, wherein said annular buoyancy chamber is filled with a buoyant material.

11. The apparatus of claim 10, wherein said buoyant material includes a closed cell, rigid foam material.

12. The apparatus of claim 8, wherein said interconnect member includes a substantially rigid interconnect stem engaged with and extending between said float means and said valve shuttle to mechanically link said float means to said valve shuttle.

13. The apparatus of claim 8, wherein said interconnect member includes a nonrigid interconnect member.

14. The apparatus of claim 13, wherein said non-rigid interconnect member includes a chain interconnect member.

15. The apparatus of claim 13, wherein said non-rigid interconnect member includes a filament interconnect member.

16. The apparatus of claim 8, wherein said spring means includes a helical compression spring disposed in compressive engagement with said valve shuttle and effective to urge said valve shuttle into said first position within said central bore of said tubular valve body to place said valve means in an open position to allow the fluid to flow from the fluid source and into the reservoir.

* * * * *